United States Patent [19]

Sabel

[11] 4,272,211
[45] Jun. 9, 1981

[54] WEAR RESISTANT SLAB

[76] Inventor: Erik A. Sabel, Industrigatan, S-531 01 Lidköping, Sweden

[21] Appl. No.: 11,860

[22] Filed: Feb. 13, 1979

[30] Foreign Application Priority Data

Feb. 27, 1978 [SE] Sweden .............................. 7802179

[51] Int. Cl.³ .............................................. E01C 11/24
[52] U.S. Cl. ......................................... 404/21; 404/44;
428/265; 52/596; 52/181
[58] Field of Search ....................... 404/20, 21, 19, 44,
404/17, 72, 34; 428/265; 52/177, 181, 596

[56] References Cited

U.S. PATENT DOCUMENTS

| 1,619,733 | 3/1927 | Jeppson | 404/21 |
|---|---|---|---|
| 1,629,185 | 5/1927 | Tone | 404/21 |
| 1,657,446 | 1/1928 | Nagin | 404/21 |
| 1,729,256 | 9/1929 | Honberger | 404/44 |
| 1,885,720 | 11/1932 | Hewett | 404/44 |
| 2,948,201 | 8/1960 | Nagin | 404/21 |
| 3,024,711 | 3/1962 | Madison | 404/21 |
| 3,497,211 | 2/1970 | Nagin | 404/44 X |

Primary Examiner—Nile C. Byers, Jr.
Attorney, Agent, or Firm—Robert E. Burns; Emmanuel J. Lobato; Bruce L. Adams

[57] ABSTRACT

A wear-resistant element, particularly in the form of a slab intended to be used as covering in areas exposed to excessive wear. The slab includes a hard wear metal of a hardness exceeding 400 Brinell, said wear-metal being in the form of granules which are embedded into a bonding agent consisting of synthetic resin, ceramic materials, rubber, or a combination of these materials. Preferably, the granules are arranged to agglomerate adjacent the wear face of the slab, whereas the concentration of wear metal towards the bottom of the slab is essentially nil. The resulting slab thus uses less amounts of the expensive wear-resistant material, and at the same time it is lighter than prior-art slabs and easier to manufacture.

10 Claims, 9 Drawing Figures

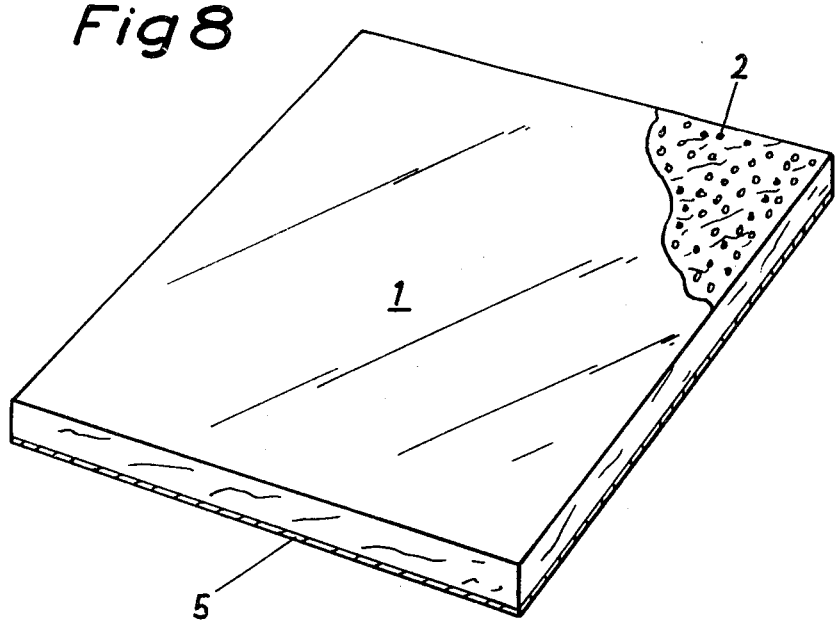
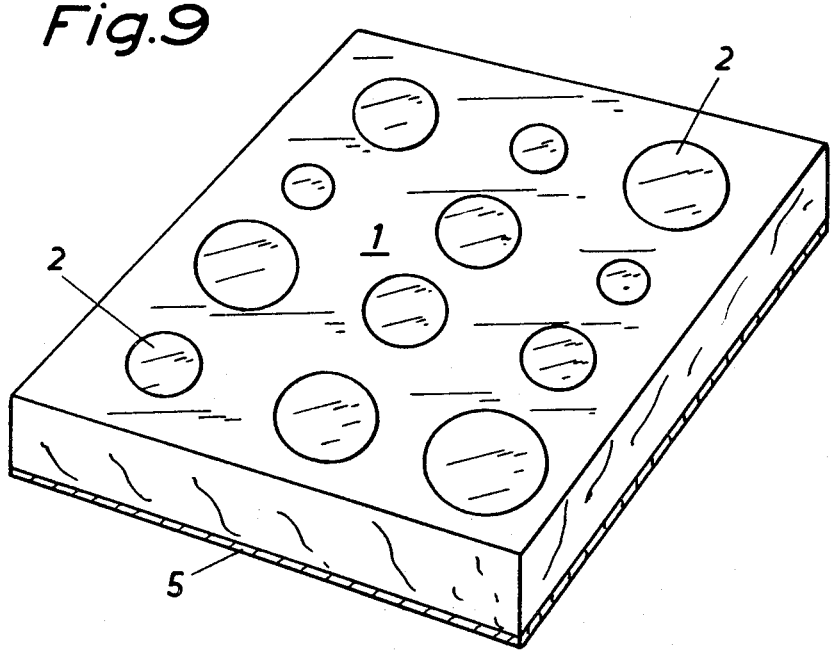

WEAR RESISTANT SLAB

BACKGROUND OF THE INVENTION

The subject invention relates to wear-resistant elements used e.g. in grinding and crushing operations as well as for road slabs in parking decks or as road coverings in front of road signs such as e.g. stop signals, pedestrian road-crossing and other traffic signs, where the wear on the road surface is excessive.

Wear metals of hard cast iron that has been reinforced to increase its ductility have hitherto been used in various fields. The strength of such wear metals is very high but nevertheless the practical use of these metals involves a number of disadvantages.

Prior-art wear-metal objects of the kind outlined above are very heavy. Their specific weight is of a magnitude of between 7 and 7.5 kg/dm$^3$ and the material therefore is difficult to handle on account of its considerable weight. Furthermore, the consumer as a rule uses at the most two thirds of the metal, the remainder being returned as scrap. Consequently, large quantities of heavy material are transported without ever being used.

A further disadvantage is that the manufacture of wear-metal objects of the kind indicated above, involving a casting process including preparation of sand, moulding, casting, knocking out and cleaning, is very complicated and time-consuming, and consequently it entails considerable costs.

SUMMARY OF THE INVENTION

The purpose of the subject invention is to provide wear-resistant elements the specific weight of which is lower than that of elements of prior-art wear metals of cast iron but which at the same time have a wear face that has at least the same hardness as prior-art wear-metal elements but are more simple to produce.

A further purpose of the subject invention is to provide a wear-resistant slab the effective wear part of which may be consumed entirely during use, thus rendering superfluous the transport of scrap metals, which is expensive.

The invention is based on the knowledge that the wear-resistant slab does not necessarily have to be homogeneous but that it is quite satisfactory for the purposes intended that a larger or smaller proportion of the element, depending on the field of usage thereof, consists of the wear-resistant material.

The wear-resistant slab in accordance with the invention is characterized in that it includes a hard wear-resistant material having a hardness of more than 400 Brinell and being in the form of granules, these granules being cast into a material which serves as a bonding agent, such as e.g. synthetic resin, ceramic materials, rubber or a combination of said materials.

In accordance with a preferred embodiment, the agglomeration of granules is at its densest adjacent the wear face of the wear-resistant slab whereas the concentration of wear material in the scrap part of the wear-resistant slab is essentially nil.

Further characteristics of the invention will appear from the appended claims.

BRIEF DESCRIPTION OF THE DRAWINGS

The invention will be described in closer detail in the following with reference to the embodiments illustrated in the accompanying drawings, wherein FIG. 8 illustrates in a perspective view a wear-resistant slab in accordance with a fourth embodiment, and FIG. 9 illustrates in a perspective view a further embodiment of a wear-resistant slab in accordance with the invention.

DETAILED DESCRIPTION OF PREFERRED EMBODIMENTS

Figure 1:
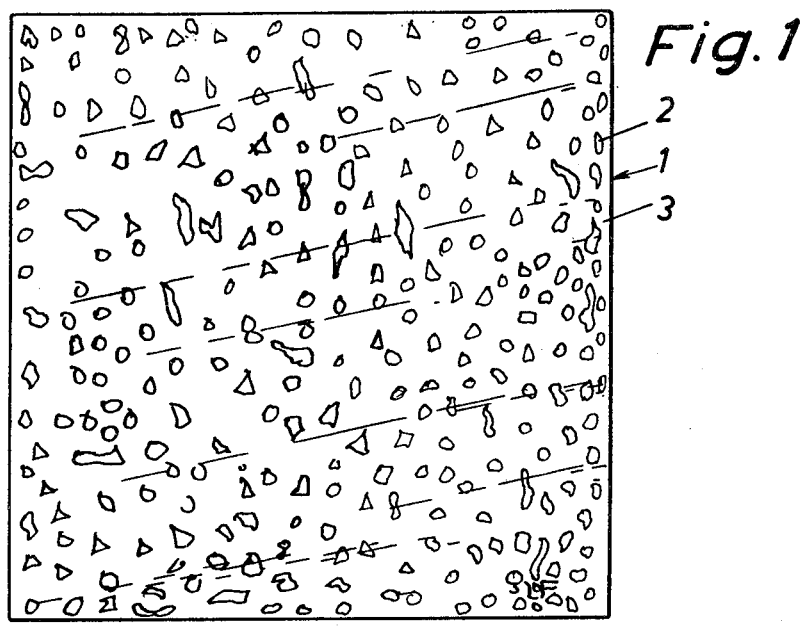
FIG. 1 illustrates a wear-resistant slab in accordance with the invention in a view directly facing the wear face thereof.

The slab in accordance with FIG. 1 which is indicated generally by numeral 1, is composed from a wear-resistant material, preferably a martensite chromium/nickel alloyed cast iron, which in the form of granules 2 is embedded into a substance 3 having a specific weight that is lower than that of cast iron. The substance 3 preferably is a synthetic resin ceramic material in which the resin component is one of a number of thermosetting resins such as epoxy resin, polyester resin, phenolic plastic, aminoplastic or polyimide resin. The latter resin is cured at a temperature of between 200° and 250° C. The synthetic resin contents in the final product may be limited to between 30 and 50%. Fillers for the elements in addition to the granules of martensite cast iron and the required thermosetting resins may be for instance quartzite or aluminium oxide, which have proved superior from a wear-resistant point of view, but also dolomite or bone-meal are suitable.

The martensite granules 2 are manufactured by pouring water over molten cast iron in the austenitic region or by casting such molten cast iron in water, whereby the material is fragmented into smaller units (granules). Quenching the smelt in the manner indicated produces granules of extremely high hardness, which is due to the fact that quenching followed by desintegration of the iron material gives a denser basic iron matrix. The resulting material is 30 to 50% harder than homogeneously cast details which are allowed to cool at a slower pace in a sand mould.

The fillers 3 in addition to the granules have a lower specific weight than the latter, with the result that the wear-resistant slab has a considerably lower weight than a wear-resistant slab consisting entirely of cast iron.

Figures 2, 3:
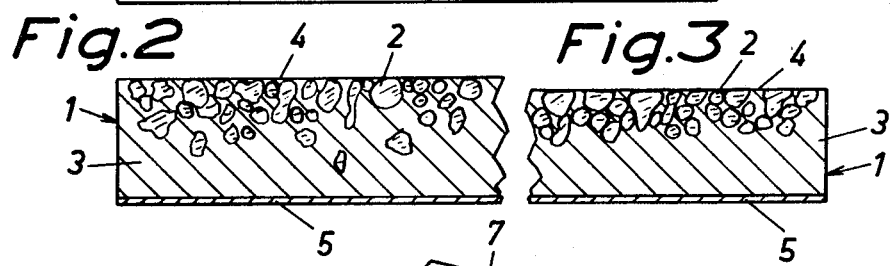
FIG. 2 illustrates in a cross-sectional view the slab in accordance with FIG. 1.
FIG. 3 illustrates in a cross-sectional view the slab of FIG. 1 when it has been used for some time.

As appears from FIG. 2 the agglomeration of granules is at its maximum adjacent to the wear face 4 of the slab 1. Adjacent to the opposite side of the slab there are no granules at all. The total weight of the slab therefore can be considerably reduced and the slab is lighter the smaller the amount of granules and the larger the amounts of other fillers that are included per unit volume. The slab in accordance with FIG. 1 thus is composed of one wear layer comprising granules and a further layer which is void of granules. When the layer serving as the wear-resistant layer is worn away the slab is substantially void of cast iron and contrary to prior-art wear-resistant slabs no scrap iron remainders are obtained.

On its back, the wear-resistant slab 1 is provided with a fiberglass mat 5 which gives the slab the required toughness. FIG. 3 illustrates the appearance of the slab of FIG. 2 after a part of the wear layer of the latter has been worn away. As appears from FIG. 3, the efficient wear area increases as one comes closer to the centres of the granules.

Figure 4:
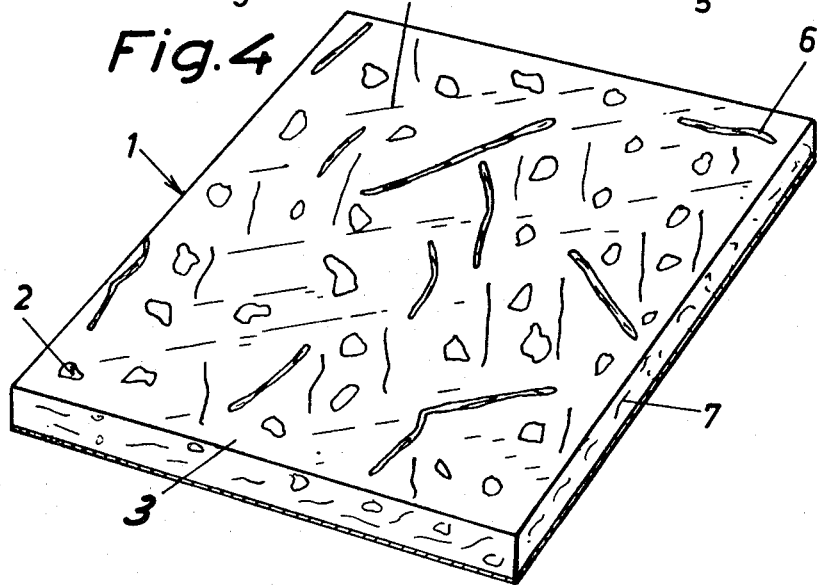
FIG. 4 is a perspective view of a wear-resistant slab in accordance with a second embodiment.

In the slab 1 in accordance with FIG. 4 the granules are more thinly scattered. This type of wear-resistant slab could be used e.g. as indicator elements in roadways or as floor covering slabs in parking garages or inserted in similar surfaces which are exposed to considerable wear. On its upper face the wear-resistant slab is provided with grooves 6 or similar means to reduce slipping hazards. Furthermore, the wear face of the slab as well as its side edges are reinforced by having crushed fiberglass 7 (so called rovings) cast therein.

Figure 5:
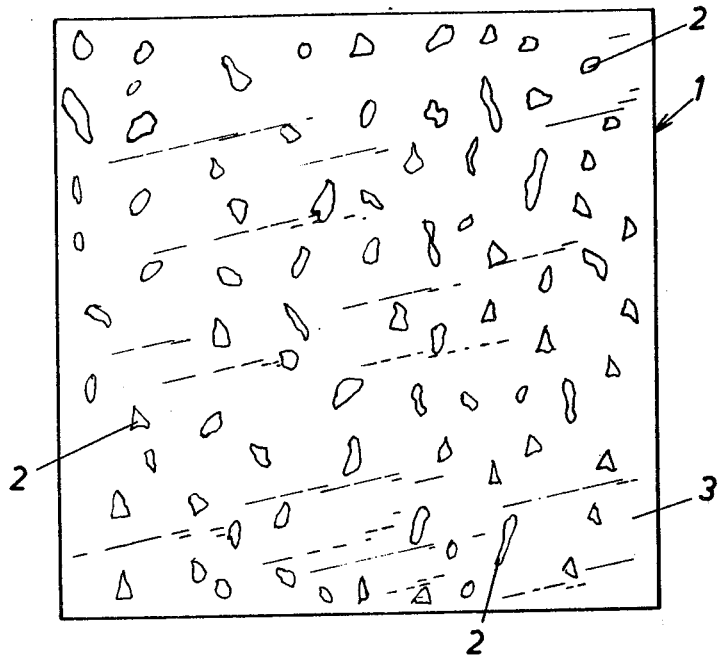
FIG. 5 is a third embodiment of a wear-resistant slab in a view directly facing the wear face thereof.
Figure 7:
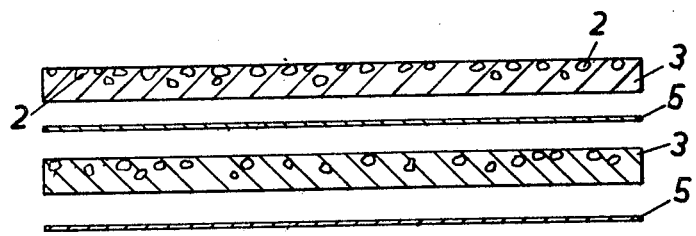
FIG. 7 illustrates the slab of FIG. 6 in assembled condition.
Figure 6:
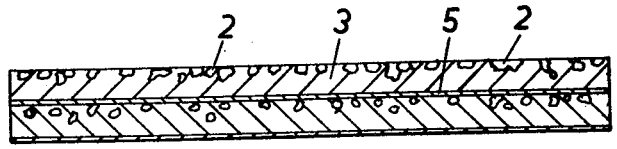
FIG. 6 is a cross-sectional exploded view of the slab in accordance with FIG. 5.

The wear-resistant slab illustrated in FIGS. 5, 6 and 7 is provided with two layers 5 in the form of fiberglass mats which make the slab extremely tough.

In the slabs described above it is not only the granules embedded therein which have an extremely high hardness but also the surrounding synthetic-resin-bonded ceramic substance is in itself an excellent wear-resistant material.

In addition to the possibility of obtaining higher hardness and a lower total weight for any given volume, the slabs of the type described above also eliminate the heavy and cost-consuming casting procedures. In the manufacture of wear resistant slabs from wear-metal in the form of granules one obtains, by casting the smelt in water, a finished product that can be embedded directly into a synthetic ceramic substance. This is advantageous, since it is easier to work synthetic resin materials in a rational manner and since these materials do not require the same expensive equipment as casting operations.

As a example may be mentioned that in casting sheet metal having a thickness of 15 millimeters one obtains an HB hardness of between 650 and 700, whereas by quenching martensite cast iron to form granules it is possible to achieve an estimated hardness of up to as much as HB 1000.

In the slab in accordance with FIG. 8, the granules 2 consist of tempered and crushed steel having a hardness of between HB 400 and 500.

FIG. 9 illustrates a wear-resistant slab, wherein instead of granules are embedded profiled members 2 of stainless steel. Slabs of this kind are intended for lighter wear caused by sand or tyre studs, such as is the case for instance in garage drives, in parking garages, on road indicators or on garden slabs.

The invention is not limited to the embodiments described above but various modifications are possible within the scope of the appended claims.

In addition to the fillers mentioned above other filler such as talcum, asbestos, wood dust and various kinds of fibrous materials may be used.

Instead of arranging the granules in a synthetic resin ceramic material they may be embedded into rubber or a combination material of rubber and synthetic resin.

In the manufacture of the slabs described above, they may be provided with apertures for reception of screws or bolts. The slabs may also be glued to a support. They may also be tinted as required.

The slabs illustrated in the drawings are intended for embodiment into the support. However, the slabs may also be thin, allowing them to be applied directly on top of a surface.

The slabs may also be made noise and vibration damping by suitable choice of fillers or by arrangement of a particular damping layer therein.

What I claim is:

1. A method of making a wear-resistant slab which comprises, rapidly quenching austenitic molten cast iron by contacting said molten cast iron with water to produce martensite granules of extremely high hardness, and embedding said granules in a slab-forming body of material selected from the group consisting of synthetic resin and rubber having a lower specific weight than said granules, with said granules concentrated at the upper face of said slab, lower portions of said slab being substantially free of said granules.

2. A method according to claim 1, in which said granules, prior to being embedded in said slab-forming material, are disintegrated to produce granules of smaller size.

3. A method according to claim 1, in which said cast iron is a chromium, nickel iron alloy.

4. A method according to claim 1, in which said granules are produced with a hardness of at least HB 1000.

5. A method according to claim 1, in which fillers of a specific weight less than that of said granules is incorporated in said slab-forming material.

6. A method according to claim 1, in which a fiberglass mat is affixed to the lower face of said slab.

7. A wear resistant slab produced by the method of claim 6.

8. A wear resistant slab produced by the method of claim 1.

9. A method according to claim 1, in which said molten cast iron is rapidly quenched by pouring water over said molten cast iron.

10. A method according to claim 1, in which said molten cast iron is rapidly quenched by casting said molten cast iron into water.

* * * * *